(12) United States Patent
Douglas et al.

(10) Patent No.: US 7,688,762 B2
(45) Date of Patent: Mar. 30, 2010

(54) MESH BACKHAUL NETWORK PLANNING

(75) Inventors: Bretton Douglas, Normal, IL (US); Brian Hart, Sunnyvale, CA (US)

(73) Assignee: Cisco Technology, Inc., San Jose, CA (US)

(*) Notice: Subject to any disclaimer, the term of this patent is extended or adjusted under 35 U.S.C. 154(b) by 455 days.

(21) Appl. No.: 11/688,982

(22) Filed: Mar. 21, 2007

(65) Prior Publication Data
US 2008/0232256 A1  Sep. 25, 2008

(51) Int. Cl.
  H04L 12/28  (2006.01)
  H04J 3/02  (2006.01)
  H04W 72/00  (2009.01)
(52) U.S. Cl. ............... 370/255; 370/462; 455/452.2
(58) Field of Classification Search ......... 370/254–256, 370/310, 328, 329, 389, 400, 461, 462, 229–232, 370/252, 253, 401, 412, 413, 415, 417; 455/422.1, 455/445, 446, 450–452.2
See application file for complete search history.

(56) References Cited

U.S. PATENT DOCUMENTS 7,286,489 B2 * 10/2007 Ades ...................... 370/254
2004/0157613 A1   8/2004 Steer et al.
2005/0122999 A1   6/2005 Scherzer et al.
2005/0163144 A1   7/2005 Srikrishna et al.
2005/0271006 A1  12/2005 Chari et al.
2006/0046737 A1   3/2006 Douglas et al.
2006/0089148 A1   4/2006 Zhao et al.
2007/0030811 A1 *  2/2007 Frei et al. ............... 370/238
2007/0206547 A1 *  9/2007 Gong et al. .............. 370/338
2008/0025222 A1 *  1/2008 Nikolova et al. ......... 370/254

* cited by examiner

Primary Examiner—Aung S Moe
Assistant Examiner—Kerri M Rose
(74) Attorney, Agent, or Firm—Tucker Ellis & West LLP

(57) ABSTRACT

In an example embodiment, a number of contending nodes and colliding nodes for a plurality of links of a network is determined. The capacity of each of the plurality of links is determined. A sum of the traffic demand of each of the plurality of links divided the throughput of each of the plurality of links is used to form a cost function for the network. One, or more, of a group consisting of a plurality of frequency assignments, a plurality of transmit powers, and a plurality of clear channel assessment (CCA) values is searched to obtain a global minimum for the cost function. The frequency assignments, transmit powers, and/or CCA values providing the global minimum for the cost function are selected.

19 Claims, 4 Drawing Sheets

MESH BACKHAUL NETWORK PLANNING

BACKGROUND

Mesh networking is a way to route data, voice and instructions between nodes. It allows for continuous connections and reconfiguration around blocked paths by "hopping" from node to node until a connection can be established. Mesh networks are self-healing: the network can still operate even when a node breaks down or a connection goes bad. As a result, a very reliable network is formed. This concept is applicable to wireless networks, wired networks, and software interaction.

A mesh network is a networking technique which allows inexpensive peer network nodes to supply back haul services to other nodes in the same network. It effectively extends a network by sharing access to higher cost network infrastructure.

Mesh networks differ from other networks in that the component parts can all connect to each other.

Wireless mesh networking is mesh networking implemented over a Wireless LAN. This type of Internet infrastructure is decentralized, relatively inexpensive, and very reliable and resilient, as each node need only transmit as far as the next node. Nodes act as repeaters to transmit data from nearby nodes to peers that are too far away to reach, resulting in a network that can span large distances, especially over rough or difficult terrain. Mesh networks are also extremely reliable, as each node is connected to several other nodes. If one node drops out of the network, due to hardware failure or any other reason, its neighbors simply find another route. Extra capacity can be installed by simply adding more nodes with wired or wireless backhaul. Mesh networks may involve either fixed or mobile devices.

The principle is similar to the way packets travel around the wired Internet—data will hop from one device to another until it reaches a given destination. Dynamic routing capabilities included in each device allow this to happen. To implement such dynamic routing capabilities, each device needs to communicate its routing information to every device it connects with, "almost in real time". Each device then determines what to do with the data it receives—either pass it on to the next device or keep it.

In general, mesh networking replaces the access points with "backhaul nodes" that are entirely wireless, except for the electrical cord. One side of the node interfaces with Wi-Fi users, typically via 802.11b/g. The Wi-Fi user associates with the mesh network node just as it does with an access point. The other side of the backhaul node has radios that interconnect the node to other backhaul nodes that comprise the mesh network.

OVERVIEW OF EXAMPLE EMBODIMENTS

The following presents a simplified summary of the invention in order to provide a basic understanding of some aspects of the invention. This summary is not an extensive overview of the invention. It is intended to neither identify key or critical elements of the invention nor delineate the scope of the invention. Its sole purpose is to present some concepts of the invention in a simplified form as a prelude to the more detailed description that is presented later.

In an example, embodiment, optimal configuration parameters for a mesh tree are determined by a cost function defined as a sum of throughput demand divided by link throughput for each link of the mesh tree. In one embodiment, available clear channel assessment (CCA) values are tested. For each CCA value, the number of contending and colliding nodes is determined and a cost function for the entire tree is determined. The CCA that provides the lowest cost function is selected. In a second embodiment, all nodes are set to a desired CCA value and each node then increases its traffic source and demand from the root access point to determine the throughput of each link and the total throughput. The CCA value providing the highest throughput is selected. A frequency search is performed and a frequency assignment that minimizes a cost function is selected.

Still other objects of the present invention will become readily apparent to those skilled in this art from the following description wherein there is shown and described a preferred embodiment of this invention, simply by way of illustration of at least one of the best modes best suited to carry out the invention. As it will be realized, the invention is capable of other different embodiments and its several details are capable of modifications in various obvious aspects all without departing from the invention. Accordingly, the drawing and descriptions will be regarded as illustrative in nature and not as restrictive.

BRIEF DESCRIPTION OF THE DRAWINGS

The accompanying drawings incorporated in and forming a part of the specification, illustrates several aspects of the present invention, and together with the description serve to explain the principles of the invention.

DESCRIPTION OF EXAMPLE EMBODIMENTS

Figure 1:
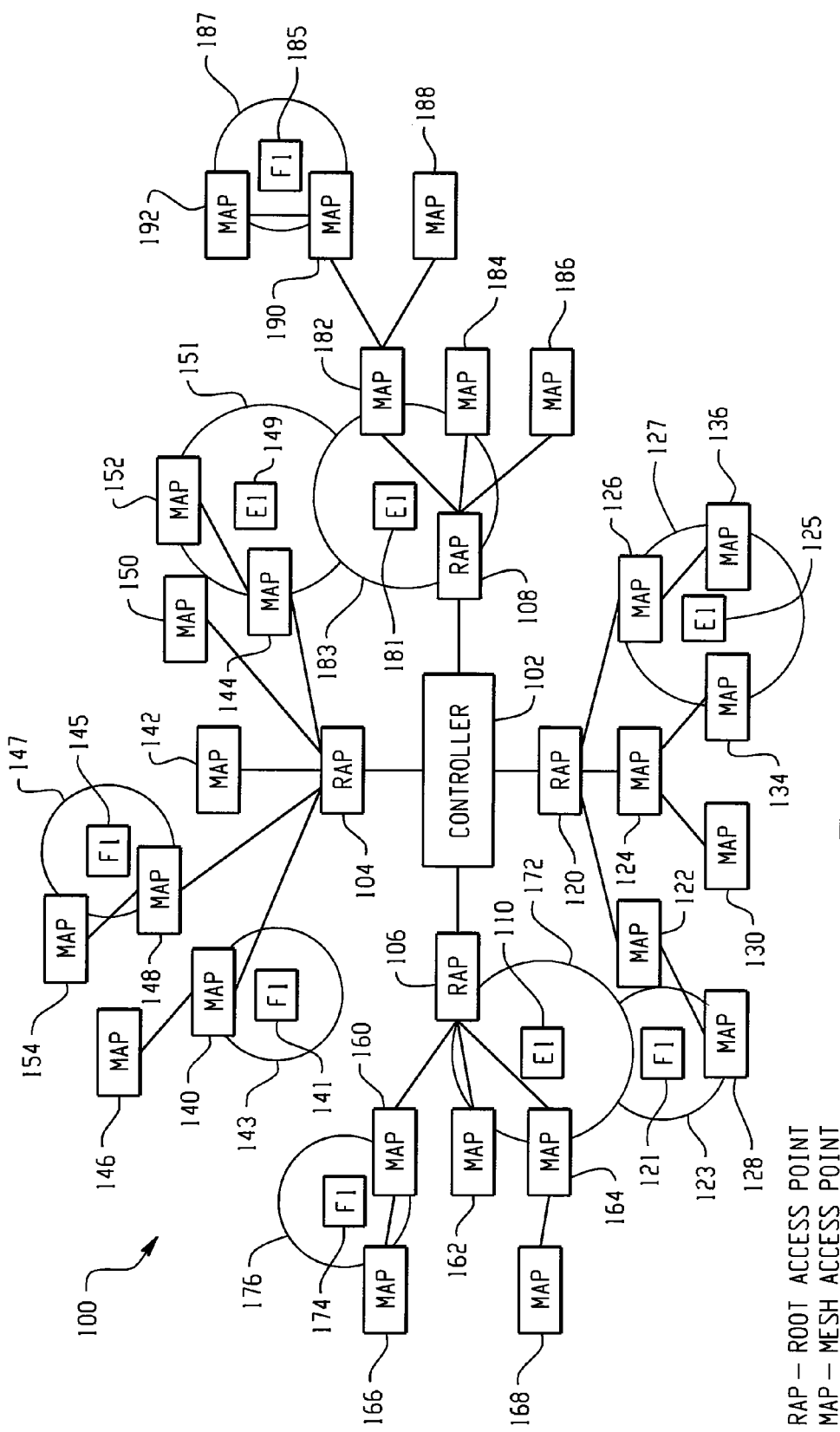
FIG. 1 illustrates an example of a mesh network.

Throughout this description, the examples shown should be considered as examples, rather than limitations, of the present invention. The figures generally indicate the features of the examples, where it is understood and appreciated that like reference numerals are used to refer to like elements.

FIG. 1 illustrates an example of a mesh network 100. A controller 102 is employed to control the network 100. Controller 102 comprises logic configured to perform the functions described herein. "Logic", as used herein, includes but is not limited to hardware, firmware, software and/or combinations of each to perform a function(s) or an action(s), and/or to cause a function or action from another component. For example, based on a desired application or need, logic may include a software controlled microprocessor, discrete logic such as an application specific integrated circuit (ASIC), a programmable/programmed logic device, memory device containing instructions, or the like, or combinational logic embodied in hardware. Logic may also be fully embodied as software.

Each tree in Network 100 has a root node (e.g., a Root Access Point or Rooftop Access Point, or "RAP") coupled to controller 102. As illustrated in FIG. 1, controller 102 is coupled to RAPs 104, 106, 108, 120. Each Mesh Access Points (MAP) is coupled either to another MAP in the tree or to the RAP. For example RAP 104 is the root node for the tree comprising Mesh Access Points (MAPs) 140, 142, 144, 146, 148, 150, 152 and 154. RAP 106 is the root access point for MAPs 160, 162, 164, 166, 168. RAP 108 is the root node for MAPs 182, 184, 186, 188, 190, 192. RAP 120 is the root node for MAPs 122, 124, 126, 128, 130, 134, 136. RAPs 104, 106, 108, 120 can be coupled to controller 102 via a wired connection, and be connected to its MAPs via a wireless connection.

The same backhaul channel is used for connecting MAPs to each other and to its RAP. For example, the same backhaul channel is used by RAP 104 and MAPs 140, 142, 144, 146, 148, 150, 152 and 154. A second backhaul channel is used by RAP 106 and MAPs 160, 162, 164, 166, 168. A third backhaul channel is used by RAP 108 and MAPs 182, 184, 186, 188, 190, 192. A fourth backhaul channel is used by RAP 120 and MAPs 122, 124, 126, 128, 130, 134, 136. Disclosed herein is a technique for controller 102 to determine the first, second, third and fourth backhaul channels. Although the example illustrated herein shows a Mesh Network with four RAPs, the technique described herein is suitable for use by networks with as little as one RAP and as large as is physically realizable.

In order to properly plan a mesh backhaul deployment, information pertaining to self-interference, external interference and foreign interference should be gathered. The example illustrated in FIG. 1 provides several examples of external and foreign interferers. For example, external interferer 125 covers an area denoted by circle 127 that interferes with the links between MAPs 126, 136 and MAPs 124, 134. External interferer 149 covers an area denoted by circle 151 that interferes with the link between MAP 144 and MAP 152. External interferer 170 covers an area denoted by circle 172 that interferes with the link between RAP 106 and MAPs 162, 164. External interferer 181 covers an area denoted by circle 183 that interferes with the link between RAP 108 and MAPs 182, 184, 186. Foreign interferer 121 covers an area denoted by circle 123 and that interferes with the link between MAPs 122, 128. Foreign interferer 141 covers an area denoted by circle 143 and that interferes with the link between RAP 104 and MAP 140. Foreign interferer 145 covers an area denoted by circle 147 and that interferes with the link between MAPs 148, 154. Foreign interferer 174 covers an area denoted by circle 174 and that interferes with the link between MAPs 160, 166. Foreign interferer 185 covers an area denoted by circle 187 and that interferes with the link between MAPs 190, 192.

There are several methods available for gathering self-interference information. For example, all the nodes (e.g. all RAPs and MAPs) in the network 100 may go to a common channel and send out beacons at the lowest possible data rate and the highest possible transmit power. Each node would be set to its lowest possible (most sensitive) receiver sensitivity and CCA threshold. Each receiving node would log the MAC address and RSSI of received beacons and send that information back to controller 102. This could happen when the network first comes up, late at night, during a network downtime, or any other time that it is convenient for the operator. Another approach would be to have the mesh nodes periodically hop to different channels and send beacons. The nodes that received the beacons would then send the transmitting node's MAC address and the corresponding RSSI to controller 102.

As an example method for gathering external interference information, each node could periodically hop to the other channel, set to its lowest possible receiver sensitivity and CCA threshold, and either send a probe request to see which nodes respond, or passively listen for beacons. The MAC addresses and received signal strengths of the beacons and probe responses would be forwarded on to the network controller 102. Ideally the mesh nodes would gather information on the duty cycle of each external interference source as well.

The nodes may further comprise logic to detect, classify, measure the signal strength, and measure the duty cycle, from a wide variety of foreign interferers. Alternatively, some information on the presence of foreign interferers can be gathered by conducting link tests from node to node across all the possible channels. If a particular channel or set of channels is found where there is a high Received Signal Strength, (e.g. 10 dB or more above the sensitivity of the data mode being used), but also has a high packet error rate, (e.g. more than 20%), it can be indirectly concluded that the channel is subject to foreign interference at the receiving node.

The peak and average traffic demand for each node should be logged. This can be logged either by logic at the node, the RAP and/or controller 102.

Three parameters that could be adjusted on each mesh node are the Channel Assignment, Transmit Power and Clear Channel Assessment Threshold. Channel assignment is done when more than one channel is available. In an unlicensed band, reducing Transmit Power will decrease the signal strength at each receiving node. The external interference levels, foreign interference levels, and noise level will remain the same, so there is seldom benefit in reducing the transmit power from the maximum amount allowed.

The clear channel assessment threshold has a sweet spot. When the clear channel assessment threshold is set too low, the mesh node will detect a whole lot of self interference, external interference, and foreign interference, and it will seldom take the opportunity to transmit. When the clear channel assessment threshold is set too high, the mesh node will detect too little interference, and often transmit at a time when significant interference is present, causing a collision. The "sweet spot" is the point where the sum of the costs due to contention and the costs due to collision reach a minimum.

For the present example, the following information are inputs to the network planning algorithm:
1. The Path loss between each pair of mesh nodes on the managed network.
2. The Signal Strength received from each unmanaged node, and the duty cycle of that node.
3. The set of common-channel node assignments.
4. A measure of impairment for each node/channel combination due to foreign interference.
5. Peak and Mean Traffic demand (both upstream and downstream) at each node.

In an example embodiment, controller 102 uses a cost function described herein. Logic in controller 102 then performs a search algorithm to minimize the cost function. The cost function utilizes the following parameters:

Throughput Demand—The Mean or Peak Throughput demanded by a mesh node over a certain time interval;

Throughput Supply—An estimate of the Throughput that is available over a link on a particular channel;

Capacity—The fraction of a channel available to a single node;

MAC Throughput—The Throughput of a link if the entire channel were available to it;

Link Throughput—The Throughput of a link in a given interference environment.

MAC Throughput is a function of the received signal strength and the average packet size between two nodes. It can be calculated via a lookup table. For example, the RSSI between each node gets mapped to MAC throughput to determine the average rate of data transfer for each link. The MAC throughput can be a function of the PHY data rate that the channel can support and the average packet size of the data being transmitted. The below table illustrates an example of MAC throughput vs. RSSI for an 802.11g compatible point-to-point link.

| Required RSSI | PHY Data Rate | 100 Byte MAC Thr. | 400 Byte MAC Thr. | 1500 Byte MAC Thr. |
|---|---|---|---|---|
| −92 | 1 | 0.45 | 0.77 | 0.92 |
| −86 | 2 | 0.58 | 1.24 | 1.72 |
| −84 | 5.5 | 0.90 | 2.41 | 4.10 |
| −77 | 11 | 1.10 | 3.39 | 6.88 |
| −86 | 6 | 1.57 | 3.52 | 5.05 |
| −79 | 9 | 1.99 | 4.79 | 7.29 |
| −81 | 12 | 2.18 | 5.65 | 9.23 |
| −78 | 18 | 2.50 | 7.05 | 12.73 |
| −76 | 24 | 2.78 | 8.24 | 15.90 |
| −69 | 36 | 2.99 | 9.57 | 20.73 |
| −64 | 48 | 3.09 | 10.36 | 24.38 |
| −60 | 54 | 3.18 | 10.80 | 26.13 |

If a subset of data modes are used, the mapping becomes simpler.

For each link, Capacity is defined as follows:

Downstream Capacity=Downstream Traffic on the link/(Downstream Traffic on the link+Traffic on Contending Nodes+2*Traffic on Colliding Nodes)

Upstream Capacity=Upstream Traffic on the link/(Upstream Traffic on the link+Traffic on Contending Nodes+2*Traffic on Colliding Nodes)

A contending node is a node that will prevent another node from transmitting when the contending node is transmitting. A node will not transmit if a signal from another transmitting node is above its receiver sensitivity.

A colliding node is a node that transmits at the same time as the node of interest. When the node of interests transmits, its signal is too weak at the receiver of a colliding node to cause it to defer, but the signal strength from the colliding node is strong enough to adversely affect the throughput of the node of interest. The degradation caused by these node collisions from another node is calculated as follows:

2*Sum over All nodes (Number of nodes experiencing collisions/Number of nodes in the Cell).

For each link, between two nodes (e.g. Node A and Node B), Link Capacity is defined as follows:

Link Throughput of $A$ & $B$=Downstream Capacity*Downstream $MAC$ Throughput+Upstream Capacity*Upstream $MAC$ Throughput.

The cost function for a tree can be expressed as the Sum over all Links of (Throughput Demand of the Link)/(Link Throughput).

The CCA can be calculated as follows by controller 102. In one embodiment, each tree at a time is examined. For example, one tree is formed by nodes coupled (directly or indirectly) to RAP 104, another tree is formed by nodes coupled to RAP 106, and other trees are formed by nodes coupled to RAPs 108, 120. The CCA value for each node in the tree is swept (e.g. each CCA value is tested). For each CCA value, the number of contending and colliding nodes is determined. The cost function for the entire tree is calculated based on the number of contending and colliding nodes. Controller 102 then selects the CCA value that provides the lowest cost function.

In another embodiment, the best channel assignment (e.g. the one with the least interference) is selected for a mesh tree. All nodes in the tree are set to the minimum CCA value. Each node in the tree ramps up its traffic sourced and traffic demanded from its RAP. The throughput of each link and the total throughput is logged and a determination is made whether there was a time when the traffic supplied did not match the traffic demand. This procedure then repeated for each CCA value. The CCA value that provided the highest throughput for the tree is selected.

A frequency search is preformed in order to find the frequency assignment for each tree that minimizes the cost function by controller 102. Controller 102 may perform any suitable frequency search algorithm (e.g. sweep through all frequencies, perform a coarse search followed by a fine search, etc.).

There are several factors that can influence the performance of mesh networks which often change over time. New external interferers and foreign interferers may be introduced. The traffic demand of each node can change over time. New nodes can be added. Propagation conditions can change (e.g., environmental conditions such as leaves on trees may change, or climatological changes such as temperatures may affect the output power of the wireless transceivers and/or change the noise floor). Propagation changes and a change in the interference environment will lead to changes in the routing for each mesh node.

Therefore, controller 102 should repeat the data capture, frequency planning, and CCA threshold planning periodically in order to maintain network performance. It may also be desirable to re-run the frequency and sensitivity planning when a certain number of nodes lose connectivity and are forced to reroute.

In an example embodiment, controller 102 measures the path loss between each pair of mesh nodes. The controller determines the number of contending nodes and colliding nodes for each link. Controller 102 can use path losses, TX power, sensitivity, and CCA threshold to determine the number of contending nodes and the number of colliding nodes for each link. Controller 102 uses the data rate, traffic on the link of interest, traffic on contending nodes, and traffic on colliding nodes to determine the capacity of each link. Controller 102 sums the traffic demand of each link divided by the throughput of each link to form a cost function of the entire network. Controller 102 searches through frequency assignments and CCA levels to obtain a global minimum for the cost function. In an example embodiment, controller 102 searches through all the possible frequency assignments and CCA levels.

Controller 102 can employ any suitable method for determining path loss between a pair of mesh nodes. For example, methods for determining path loss include, but are not limited to:
1. Use DSSS mode, (1 Mbps for 11 G) where the sensitivity of the data mode is at or below the noise floor;
2. Use half-bandwidth or quarter-bandwidth OFDM modes, where the sensitivity of the data mode is at or near the noise floor for a full bandwidth channel.
3. Do simultaneous link testing over pairs of nodes, and examine throughput and number of collisions to determine which nodes contend, and which nodes collide with the link of interest.

Controller 102 can also employ various methods for searching frequency such as 1) Exhaustive (if there aren't too many mesh trees), or 2) a Fast Search which is described herein infra. In an example embodiment, a goal of the fast evaluation metric is to find frequency combinations that yield a small number of contentions between different mesh trees. Those same frequency combinations can be expected to yield a small cost function and a large network capacity.

For example, if there are M different mesh trees, each of which can operate on N different channels, there are N^M possible channel assignments. Each channel assignment can take on a unique index. For example, for an 802.11b/g compatible network, the channel indices would be:

Channel Index (C) 802.11b/g channel

0: channel 1

1: channel 6

2: channel 11

Each frequency combination can be assigned a unique index based on the channel assignments of each access point. For instance with 9 mesh trees, the frequency combination index would yield:

Solution Index=$C1+N*C2+N2*C3+N3*C4+N4*C5+N5*C6+N6*C7+N7*C8+N8*C9$.

For 802.11b/g compatible network, where N=3, the minimum solution index would be 0, and the maximum solution index would be 19682 for a total of 19683 different solution indices. The fast evaluation metric and the cost function are not smooth functions of the solution index, changing one frequency value will often cause a significant change in both metrics. Therefore an algorithm employed on controller 102 searches through a subset of the solution indices in order to find the best solution.

In an example embodiment, the initial frequency search is performed over a relatively small set of solution indices, e.g. 100 to 1000. The primary motivation for the initial frequency search is to find a good set of solutions for the initial CCA level sweep. First the total number of solutions is calculated, using the following formula: Total Number of Solutions=$N^M$, Where N=the number of possible frequencies for each mesh tree, and M=the total number of mesh trees being configured. The step size through the solution indices is calculated by:

Step size=Total Number of Solutions/Initial Frequency Search Size, where Initial Frequency Search Size is either a defined parameter or a parameter calculated from a predefined time period (the acceptable delay in finding the best solution).

If step size is a power of N, (the number of frequencies), step size is modified to be:

Step size=Total Number of Solutions/(Initial Frequency Search Size+1). Once Step Size is calculated the fast metric is calculated (Initial Frequency Search Size) times. Each calculation is as follows:

For Search index=0 to (Initial Frequency Search Size−1)

Solution Index=round(Step size*search index);

Calculate frequency allocation from the solution index;

Calculate the fast evaluation metric using a threshold (max power of a mesh node minus receiver sensitivity minus some margin); and Store the frequency allocation and the fast evaluation metric. If N^M (the Total Number of Solutions) is small, every possible solution can be tried. For example, if 3 channels are available and 6 mesh trees are being managed, the total number of solutions will be $3^6$, or 729, so every possible solution can be tried. However, for a large number of mesh trees, 12 for example, the total number of solutions will be 3^12 or 531441, so a step size is calculated as before using the following formula:

Step size=Total Number of Solutions/Initial Frequency Search Size where Initial Frequency Search Size is either a defined parameter or a calculated parameter such as how long the operator was willing to wait for a solution. If step size is a power of N, step size should be modified to be:

Step size=Total Number of Solutions/(Initial Frequency Search Size+1)

The fast metric is then calculated in the same way as it was in the initial frequency search.

Controller 102 can be configured to also perform a CCA search. Methods for searching the CCA search can include a Maximum Possible Power or a Coarse Power Search. If AP to AP path losses are known down to the noise floor, then controller 102 can use TX power, path loss, and CCA threshold to calculate contentions and collisions in closed form. Controller 102 then sweeps the possible values of CCA from min to max in order to find a global CCA value that minimizes the cost function.

If AP to AP pathlosses are not known down to the noise floor, controller 102 can first acquire system parameters, e.g. Frequency plan and TX power, etc. and implement the following methodology to scan for optimal CCA level. Controller 102 can generate traffic on all links in a mesh tree. The traffic is ramped up until mesh queues start to overload. Controller 102 determines the capacity for that CCA setting. Controller 102 tries the next CCA setting, and repeats until all the CCA settings are tried. Controller 102 selects the CCA setting that yields the highest throughput.

Controller 102 calculates the throughput demand. Methods for Calculating the Throughput Demand can include 1. Initially—Default Value.

2. Ongoing—Log the Mean and max traffic per minute. Calculate Mean, Max, and Histogram. Using:

A. The max traffic logged for each link;

B. The mean traffic logged for each link;

C. Use some linear combination of the mean and max value of the traffic logged on each link; and D. Use some percentile from the Histogram, e.g. $90^{th}$, $95^{th}$, $99^{th}$ etc for traffic demand.

Figure 2:
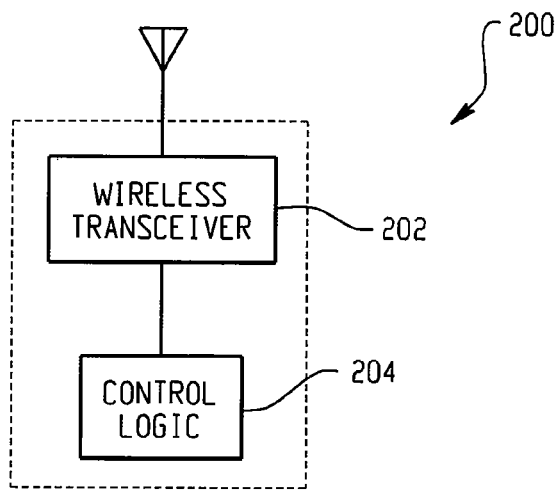
FIG. 2 illustrates an example of a mesh node.

FIG. 2 illustrates an example of a mesh node 200. Mesh node 200 comprises at least one wireless transceiver 202 and control logic 204. The at least one wireless transceiver 202 may further comprise a wireless transceiver for access (e.g. communicating with client nodes) and a wireless transceiver for backhaul (e.g. communicating with a RAP and/or other MAPs). Control logic 204 controls the operation of wireless transceiver 202. Control logic 204 may further comprise logic for performing functions described herein and/or store results. For example, for detecting self-interferers, logic 204 may store the RSSI and MAC addresses of other nodes detected by wireless transceiver 202, and may further transmit the RSSI and MAC addresses of other nodes detected by wireless transceiver 202 to another MAP or RAP for processing by controller 102.

Figure 3:
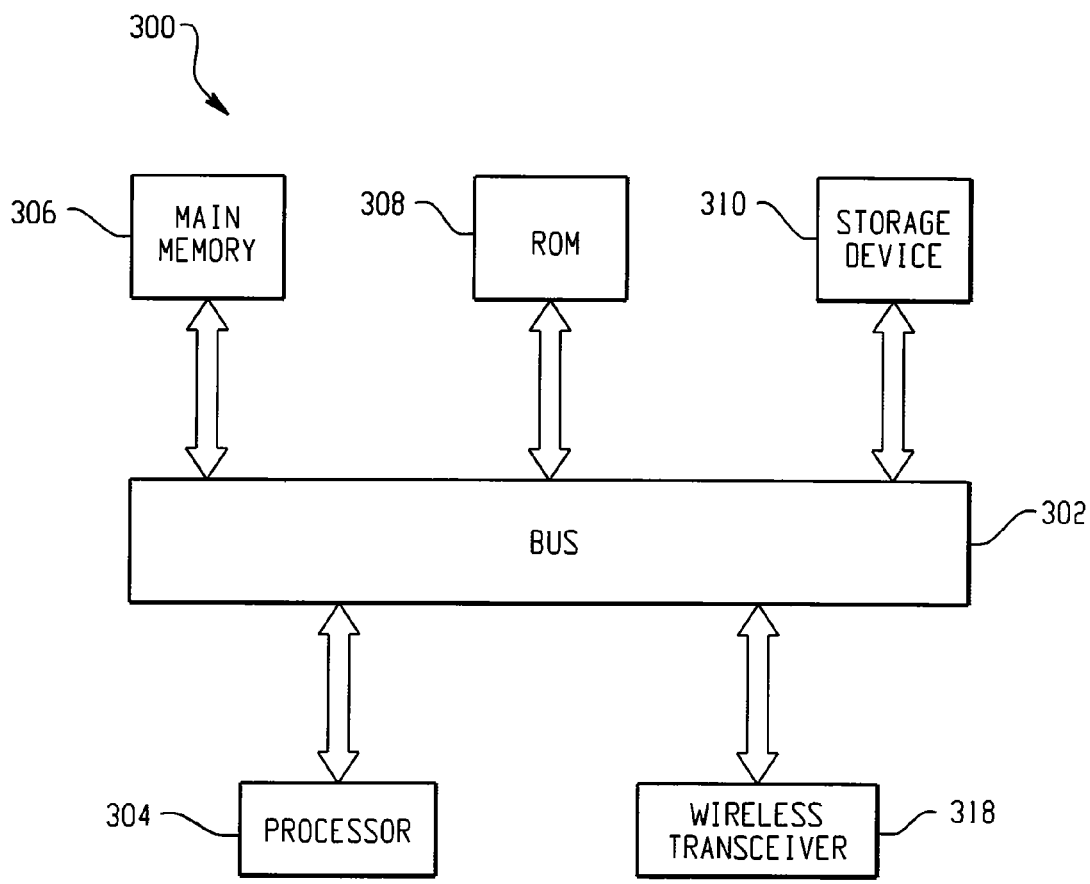
FIG. 3 illustrates an example of a computer system for implementing an embodiment described herein.

FIG. 3 is an example of a computer system 300 upon which an embodiment of the invention may be implemented. Computer system 300 may be utilized by controller 102 (FIG. 1) to perform the functions described herein. Computer system 300 may also be utilized for control logic 204 (FIG. 2).

Computer system 300 includes a bus 302 or other communication mechanism for communicating information and a processor 304 coupled with bus 302 for processing information. Computer system 300 also includes a main memory 306, such as random access memory (RAM) or other dynamic storage device coupled to bus 302 for storing information and instructions to be executed by processor 304. Main memory 306 also may be used for storing a temporary variable or other intermediate information during execution of instructions to be executed by processor 304. Computer system 300 further includes a read only memory (ROM) 308 or other static storage device coupled to bus 302 for storing static information and instructions for processor 304. A storage device 310, such as a magnetic disk or optical disk, is provided and coupled to bus 302 for storing information and instructions.

An embodiment of the invention is related to the use of computer system 300 for mesh network backhaul planning. According to one embodiment of the invention, mesh network backhaul planning is provided by computer system 300 in response to processor 304 executing one or more sequences of one or more instructions contained in main memory 306. Such instructions may be read into main memory 306 from another computer-readable medium, such as storage device 310. Execution of the sequence of instructions contained in main memory 306 causes processor 304 to perform the process steps described herein. One or more processors in a multi-processing arrangement may also be employed to execute the sequences of instructions contained in main memory 306. In alternative embodiments, hard-wired circuitry may be used in place of or in combination with software instructions to implement the invention. Thus, embodiments of the invention are not limited to any specific combination of hardware circuitry and software. The term "computer-readable medium" as used herein refers to any medium that participates in providing instructions to processor 304 for execution. Such a medium may take many forms, including but not limited to non-volatile media and volatile media. Non-volatile media include for example optical or magnetic disks, such as storage device 310. Volatile media include dynamic memory such as main memory 306. Common forms of computer-readable media include for example floppy disk, a flexible disk, hard disk, magnetic cards, paper tape, any other physical medium with patterns of holes, a RAM, a PROM, an EPROM, a FLASHPROM, any other memory chip or cartridge, a carrier wave as described hereinafter, or any other medium from which a computer can read.

Various forms of computer-readable media may be involved in carrying one or more sequences of one or more instructions to processor 304 for execution. For example, the instructions may initially be borne on a magnetic disk of a remote computer. The remote computer can load the instructions into its dynamic memory and send the instructions over a telephone line using a modem. A modem local to computer system 300 can receive the data on the telephone line and use an infrared transmitter to convert the data to an infrared signal. An infrared detector coupled to bus 302 can receive the data carried in the infrared signal and place the data on bus 302. Bus 302 carries the data to main memory 306 from which processor 304 retrieves and executes the instructions. The instructions received by main memory 306 may optionally be stored on storage device 310 either before or after execution by processor 304.

Optionally, computer system 300 also includes transceiver 318 coupled to bus 302. In the case of a RAP or MAP, transceiver 318 can be a wireless transceiver that provides a wireless two-way data communication. If computer system 300 is being implemented as a controller, transceiver 318 can provide a means of communication with the RAP for each tree. For example, transceiver 318 may be an integrated services digital network (ISDN) card or a modem to provide a data communication connection to a corresponding type of telephone line. As another example, transceiver 318 may be a local area network (LAN) card to provide a data communication connection to a compatible LAN. Wireless links may also be implemented. In any such implementation, transceiver 318 sends and receives electrical, electromagnetic, or optical signals that carry digital data streams representing various types of information.

Signals received by transceiver 318 are converted to digital signals and can be sent to storage device 310 or main memory 306 via bus 302, which can then be processed by processor 304. Processor 304 can send data via bus 302 to transceiver 318 for transmission to other nodes.

Figure 4:
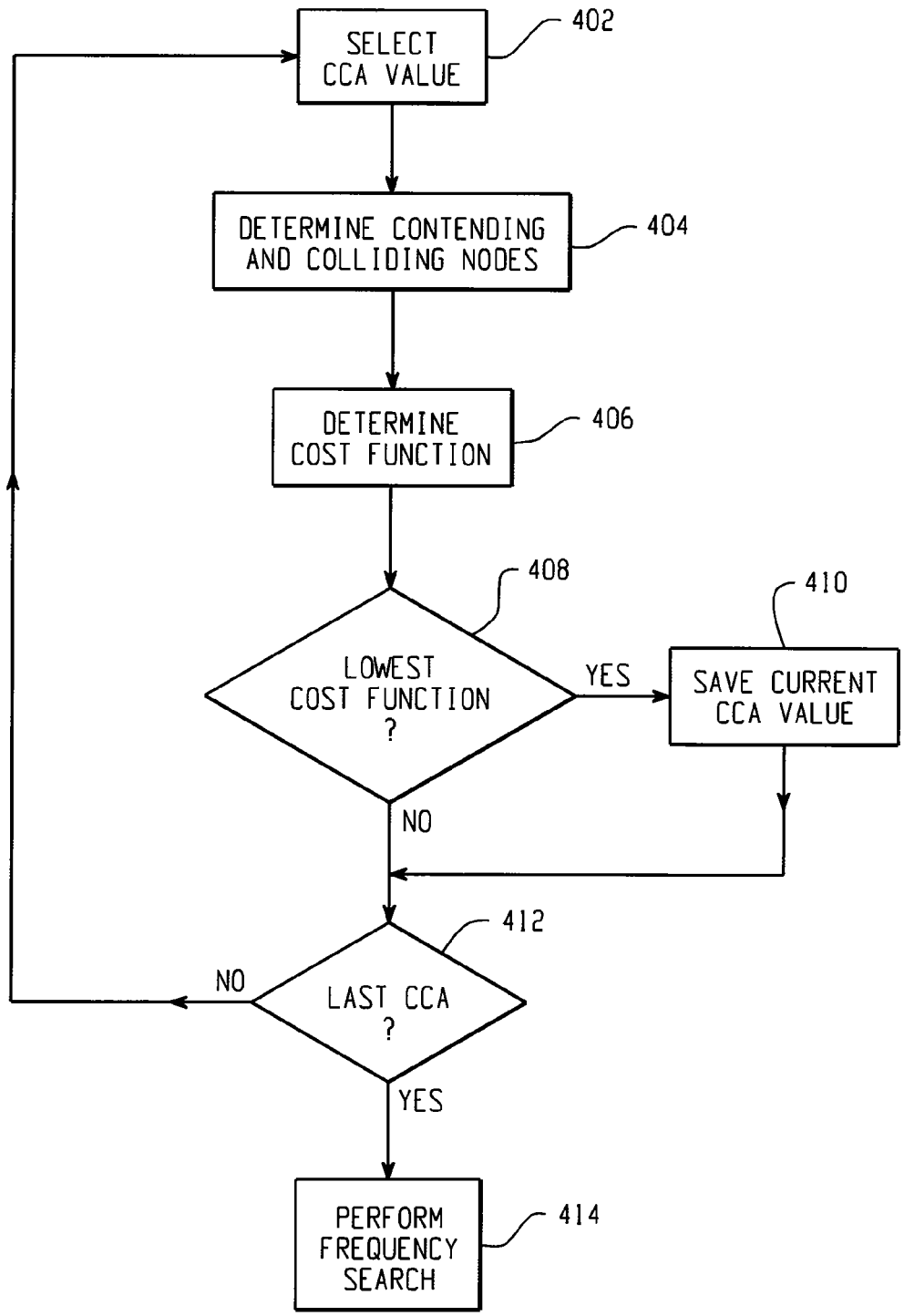
FIG. 4 illustrates an example methodology for determining operating parameters for a mesh network.
Figure 5:
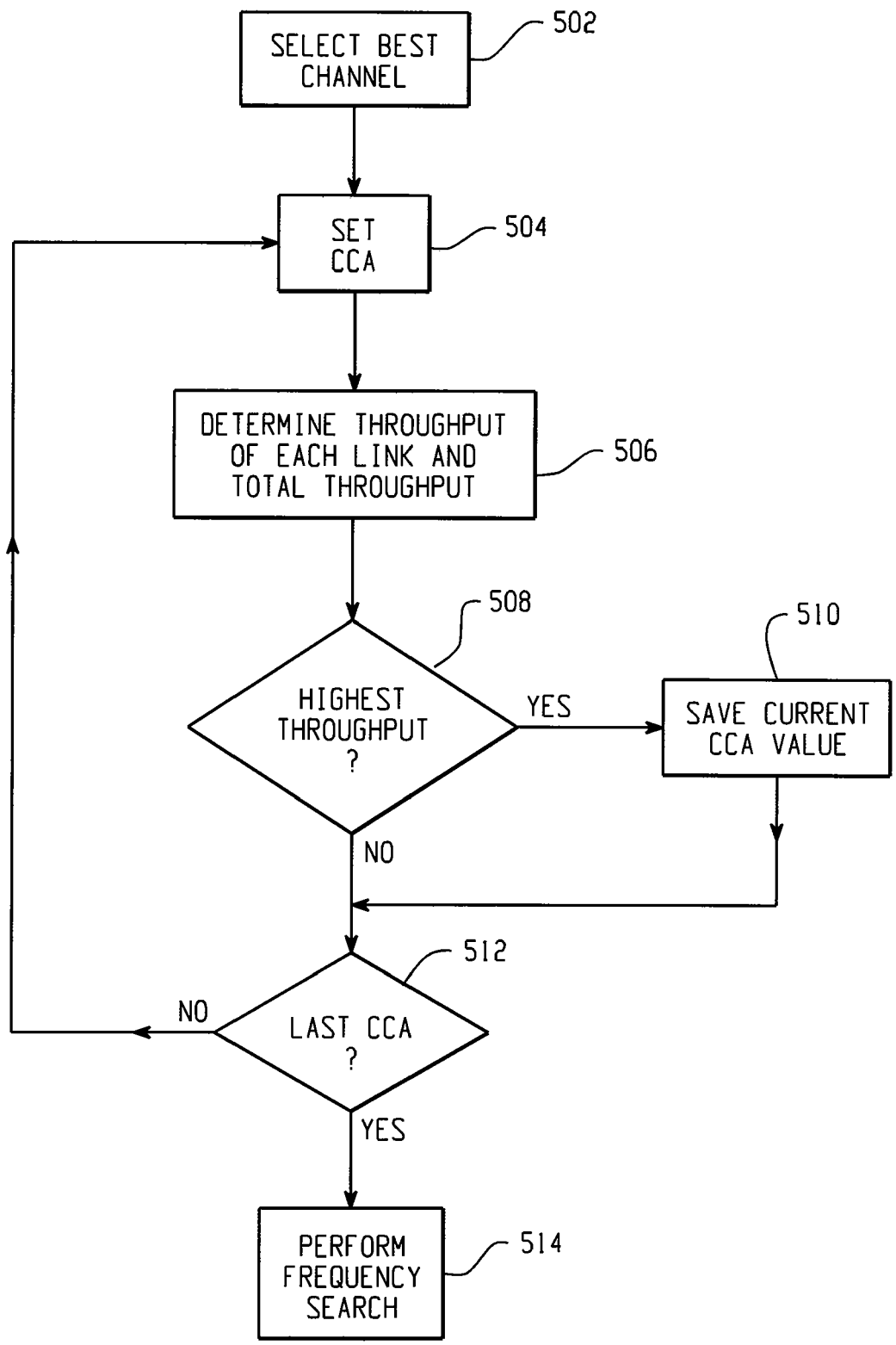
FIG. 5 illustrates a second example methodology for determining operating parameters for a mesh network.

In view of the foregoing structural and functional features described above, a methodology in accordance with various aspects of the present invention will be better appreciated with reference to FIGS. 4 and 5. While, for purposes of simplicity of explanation, the methodologies of FIGS. 4 and 5 are shown and described as executing serially, it is to be understood and appreciated that the present invention is not limited by the illustrated order, as some aspects could, in accordance with the present invention, occur in different orders and/or concurrently with other aspects from that shown and described herein. Moreover, not all illustrated features may be required to implement a methodology in accordance with an aspect the present invention. Embodiments of the present invention are suitably adapted to implement the methodology in hardware, software, or a combination thereof.

FIG. 4 illustrates an example methodology 400 for determining operating parameters for a mesh network. This example determines the best CCA value for a mesh tree. At 402, an initial CCA value is selected (e.g. lowest value, highest value or any desired value). As the methodology continues to execute, each time step 402 is reached another CCA value is selected until all of the desired CCA values have been used. At 404, the contending and colliding nodes for the CCA value set at 402 is determined. Contending nodes would be nodes whose received signal is sufficiently high that it would prevent a node from transmitting. Colliding nodes would be nodes that may transmit at the same time and interfere with each others signals. At 406, a cost function employing the contending nodes and colliding nodes can be determined. As was described in one example herein, a suitable cost function would be to determine the capacity for each link. The capacity can be determined as follows:

Downstream Capacity=(Downstream Traffic on the link)/(Downstream Traffic on the link+Traffic on Contending Nodes+2*Traffic on Colliding Nodes)

Upstream Capacity=(Upstream Traffic on the link)/(Upstream Traffic on the link+Traffic on Contending Nodes+2*Traffic on Colliding Nodes)

The link throughput can be calculated as follows:

Link Throughput of $A$ & $B$=Downstream Capacity*Downstream MAC Throughput+Upstream Capacity*Upstream MAC Throughput.

The cost function for a tree can be expressed as the Sum over all Links of Throughput Demand of the Link/Link Throughput.

At 408, it is determined whether the currently calculated cost function is the lowest cost function for the CCA values tested. If the cost function is the lowest (YES), then at 410 it is stored. Otherwise (NO), processing continues directly to 412.

At 412, it is determined whether there are any more CCA values to be tested. If the current value was not the last CCA value to be tested (NO), then processing returns to 402 wherein the next CCA value is selected. Otherwise (NO), the CCA value yielding the lowest cost function is used and a frequency search is performed at 414.

FIG. 5 illustrates a second example methodology 500 for determining operating parameters for a mesh network. Methodology 500 determines the CCA value that yields the highest throughput.

At 502, a channel is selected. In one embodiment, the channel with the least interference is selected. However, any suitable technique can be employed to select a channel.

At 504, the CCA is set to a current value. In one embodiment, the initial CCA value is the minimum value and the CCA is increased each iteration. However, any suitable technique for selecting CCA values, such as maximum to minimum, can be employed.

At 506, the throughput of each link and the total throughput is measured. In one embodiment, each node in the network increases its traffic sourced and traffic demand from the RAP and the throughput is measured. A determination can also be made if there was a time when the traffic supplied did not match the traffic demand.

At 508, a determination is made whether the throughput determined at 506 was the highest for the CCA values tested. If the throughput was the highest (YES), then at 510 the current CCA value is saved. Otherwise (NO), processing proceeds directly to 512.

At 512, it is determined whether there are any more CCA values to be tested. If the current value was not the last CCA value to be tested (NO), then processing returns to 504 wherein the next CCA value is selected. Otherwise (NO), the CCA value yielding the lowest cost function is used and a frequency search is performed at 514.

What has been described above includes example implementations of the present invention. It is, of course, not possible to describe every conceivable combination of components or methodologies for purposes of describing the present invention, but one of ordinary skill in the art will recognize that many further combinations and permutations of the present invention are possible. Accordingly, the present invention is intended to embrace all such alterations, modifications and variations that fall within the spirit and scope of the appended claims interpreted in accordance with the breadth to which they are fairly, legally and equitably entitled.

The invention claimed is:

1. A method comprising:
   determining, by a processor, a number of contending nodes and a number of colliding nodes for a plurality of links;
   determining, using the processor, a capacity of each of the plurality of links;
   summing, using the processor, traffic demand of each of the plurality of links divided by throughput of each of the plurality of links to form a cost function for a network;
   searching, using the processor through one of a group consisting of a plurality of frequency assignments, a plurality of transmit powers, and a plurality of clear channel assessment levels to obtain a global minimum for the cost function;
   wherein searching through the plurality of clear channel assessment levels further comprises:
   calculating contentions and collisions, using the processor, based on transmit power, path loss and clear channel assessment for a plurality of clear channel assessment values between a minimum value and a maximum value; and
   selecting, using the processor, a clear channel assessment value that minimizes the cost function;
   wherein the access point to access point path losses are known.

2. A method according to claim 1, further comprising determining path loss, the determining path loss is based on one of a group consisting of a direct sequence spread spectrum a half-bandwidth orthogonal frequency division multiplexing mode, a quarter-bandwidth orthogonal frequency division multiplexing mode, and performing simultaneous link testing over pairs of nodes to determine which nodes contend and which nodes collide based on throughput and number of collisions.

3. A method according to claim 1, the searching through the plurality of frequencies comprises performing an initial search on a subset of solution indices based on a step size calculated by Total Number of Solutions divided by Initial Frequency Search Size.

4. A method according to claim 3, wherein the step size is calculated by Total Number of Solutions divided by (Initial Frequency Search Size+1) responsive to the step size being a power of a number of possible frequencies for each access point.

5. A method according to claim 3, performing the initial search further comprises performing for each member of the subset:
   determine a solution index that is a product of step size and search index;
   calculating a frequency allocation from the solution index;
   calculate a fast evaluation metric using a threshold of maximum transmit minus the receive sensitivity; and
   storing the frequency allocation and the fast evaluation metric.

6. A method according to claim 3, further comprising performing a final search, the final search, wherein the final frequency search uses a threshold for the fast evaluation metric that was determined in an initial power sweep.

7. A method according to claim 1, further comprising a coarse power search.

8. A method according to claim 7, further comprising a fine power search based on a small set of frequency combinations obtained during a final frequency search.

9. A method according to claim 1, the searching through the plurality of clear channel assessment levels further comprises:
   generating traffic on the plurality of links;
   increasing the traffic until mesh queues start to overload;
   determine a capacity for a current clear channel assessment setting;
   repeating the generating traffic, increasing traffic and determining the capacity for at least one other clear channel assessment setting; and
   selecting the clear channel assessment setting that yields the highest throughput.

10. A method according to claim 1, further comprising:
    switching to a common channel;
    sending a beacon at minimum data rate and maximum transmit power;
    selecting a minimum setting for receiver sensitivity;
    selecting a minimum setting for clear channel assessment; and
    logging the media access control address and received signal strength intensity of received beacons.

11. Logic encoded in one or more computer readable media for execution and when executed operable to:
- summing throughput demand divided by throughput for a plurality of links with one of a group consisting of a first clear channel assessment value, a first frequency and a first transmit power to determine a first cost function;
- summing throughput demand divided by throughput for the plurality of links with one of a group consisting of a second clear channel assessment value, a second frequency and a second transmit power to determine a second cost function;
- selecting one of a group consisting of the first clear channel assessment value, the first frequency and the first transmit power, the second clear channel assessment value, the second frequency and the second transmit power based on which of a group consisting of the first cost function and the second cost function has the lowest value and
- searching through a plurality of clear channel assessment levels, the logic for searching through a plurality of clear channel assessment levels further comprises logic when executed operable to:
- generating traffic on the plurality of links;
- increasing the traffic until mesh queues start to overload;
- determine a capacity for a current clear channel assessment setting;
- repeating the generating traffic, increasing traffic and determining the capacity for at least one other clear channel assessment setting; and
- selecting the clear channel assessment setting that yields the highest throughput.

12. The logic according to claim 11 further comprising logic when executed operable to determining path loss, the determining path loss is based on one of a group consisting of a direct sequence spread spectrum mode a group consisting of a half-bandwidth orthogonal frequency division multiplexing mode, a quarter-bandwidth orthogonal frequency division multiplexing mode, and performing simultaneous link testing over pairs of nodes to determine which nodes contend and which nodes collide based on throughput and number of collisions.

13. Logic according to claim 11, further comprising logic when executed operable to search through a plurality of frequencies by performing an initial search on a subset of solution indices based on a step size calculated by Total Number of Solutions divided by Initial Frequency Search Size.

14. Logic according to claim 13, further comprising logic when executed operable to:
- determine a solution index that is a product of step size and search index;
- calculate a frequency allocation from the solution index;
- calculate a fast evaluation metric using a threshold of maximum power minus receiver sensitivity; and
- store the frequency allocation and the fast evaluation metric.

15. Logic according to claim 11, further comprising logic when executed operable to perform a coarse power search, the coarse power search comprises one of a group consisting of determining a mean of a maximum and a minimum transmit power and subtracting receive sensitivity, determining mean pathloss of the plurality of links, determining median pathloss of the plurality of links, and calculating a combined metric for a plurality of power levels and determining a mean of transmit powers and frequencies that provide the ten best combined metrics.

16. Logic according to claim 11, further comprising:
- logic when executed operable to search through a plurality of clear channel assessment levels, the logic to search the a plurality of clear channel assessment levels further comprising logic when executed operable to:
- calculating contentions and collisions based on transmit power, path loss and clear channel assessment for a plurality of clear channel assessment values between a minimum value and a maximum value; and
- selecting a clear channel assessment value that minimizes the cost function;
- wherein the access point to access point path losses are known.

17. An apparatus, comprising:
- means for determining a number of contending nodes and a number of colliding nodes for a plurality of links;
- means for determining a capacity for each of the plurality of links;
- means for summing traffic demand of each of the plurality of links divided by throughput of each of the plurality of links to form a cost function for a network; and
- means for searching through one of a group consisting of a plurality of frequency assignments, a plurality of transmit powers and a plurality of clear channel assessment values to obtain a global minimum for the, cost function;
- wherein the means for searching searches through a plurality of frequency assignments, a plurality of transmit powers and a plurality of clear channel assessment values to obtain the global minimum for the cost function.

18. A method comprising:
- determining, using a processor, a number of contending nodes and a number of colliding nodes for a plurality of links;
- determining, using the processor, a capacity of each of the plurality of links;
- summing, using the processor, traffic demand of each of the plurality of links divided by throughput of each of the plurality of links to form a cost function for a network; and
- searching, using the processor, through one of a group consisting of a plurality of frequency assignments, a plurality of transmit powers, and a plurality of clear channel assessment levels to obtain a global minimum for the cost function;
- wherein searching through the plurality of clear channel assessment levels further comprises:
- generating traffic on the plurality of links;
- increasing the traffic until mesh queues start to overload;
- determine a capacity for a current clear channel assessment setting;
- repeating the generating traffic, increasing traffic and determining the capacity for at least one other clear channel assessment setting; and
- selecting, by the processor, the clear channel assessment setting that yields the highest throughput.

19. A method comprising:
- determining, using a processor, a number of contending nodes and a number of colliding nodes for a plurality of links;
- determining, using the processor, a capacity of each of the plurality of links;
- summing, using the processor, traffic demand of each of the plurality of links divided by throughput of each of the plurality of links to form a cost function for a network;
- searching, using the processor, through one of a group consisting of a plurality of frequency assignments, a plurality of transmit powers, and a plurality of clear channel assessment levels to obtain a global minimum for the cost function;

switching to a common channel;

sending a beacon at minimum data rate and maximum transmit power;

selecting a minimum setting for receiver sensitivity;

selecting a minimum setting for clear channel assessment; and logging the media access control address and received signal strength intensity of received beacons.

* * * * *